Patented Nov. 15, 1932

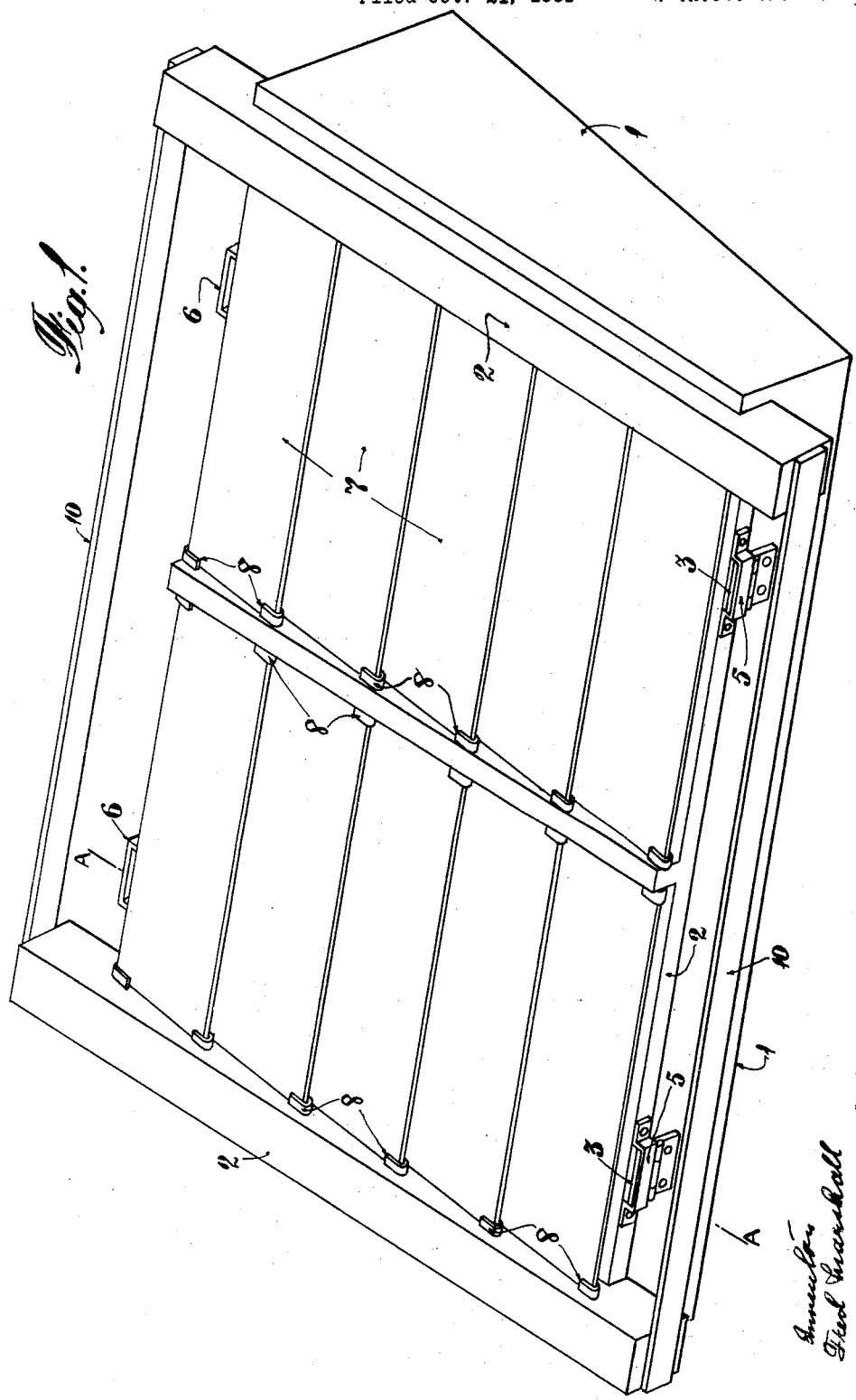

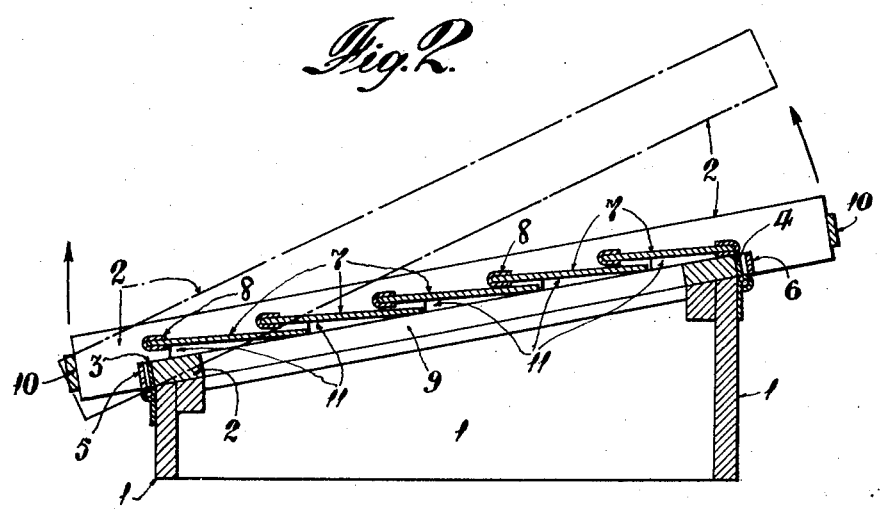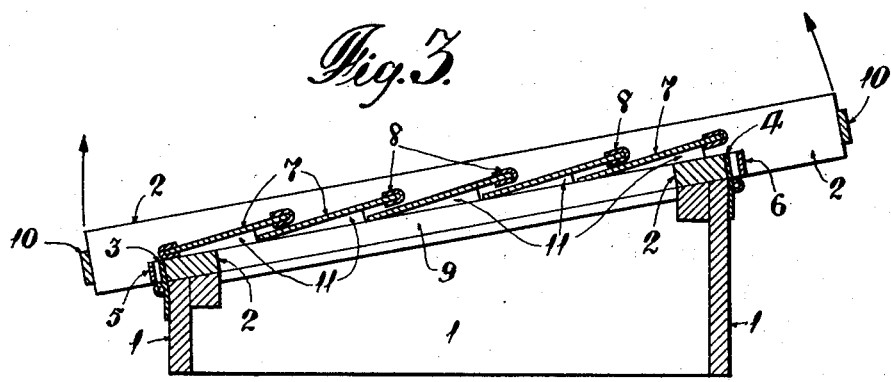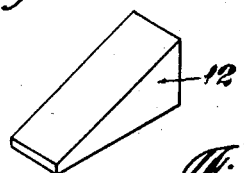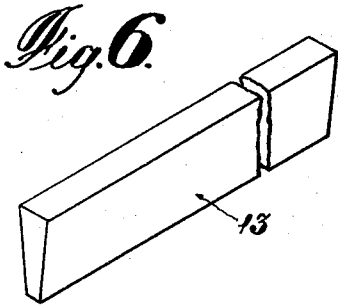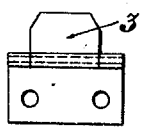

1,887,815

UNITED STATES PATENT OFFICE

FRED MARSHALL, OF BURLEY-IN-WHARFEDALE, ENGLAND

GARDEN FRAME

Application filed October 21, 1931, Serial No. 570,239, and in Great Britain October 22, 1930.

This invention relates to garden frames and other horticultural frames and houses having inclined glazing in the top or light comprising overlapping pieces of glass, the chief object being to provide for the admission of air to the interior of the frame or housing.

According to the invention the overlapping pieces of glass in the top or light of the frame or housing have their overlapping portions distanced apart to afford between them passages for the admission of air to the interior of the frame. Normally the top or light will be mounted on the wall structure of the frame so that rain water falling on the glazing will run down from one piece of glass to the other and finally fall outside the frame, whilst if it is desired to admit rain water to the interior the top or light may be reversed so that rain water falling on the pieces of glass will run between the overlapping portions and drip off the lower edges of the pieces of glass on to the soil enclosed by the frame. In this latter connection the plants within the frame would preferably be arranged below the centres of the pieces of glass or between the overlapping portions thereof so that the drippings will not fall directly on to the plants but on to the soil between them, thereby avoiding any risk of the plants being "damped off".

In an embodiment of the invention, the pieces of glass are in the form of transversely arranged overlapping strips distanced apart in louvre formation so as to afford the air passages between them, and the strips of glass are secured in position within the top or light of the frame by hook members or clips which not only support the said strips but also serve to distance their overlapping portions apart, said hooked members or clips being secured to the side members of the top or light and engaging the edges of the glass strips. The top or light may be removably mounted upon the wall structure of the frame by means of appropriate slotted or recessed brackets on the upper and lower transverse members of said top or light being engaged by tongues or projections on the rear and front walls of the frame. In this latter connection the tongues or projections for engaging the slotted brackets may be pivotally connected to the rear and front walls so as to permit the top or light to be raised either at the rear or front about said hinged connections with the wall structure.

In order that the invention may be clearly understood and readily carried into effect, the same will now be more fully described with reference to and by the aid of the accompanying drawings; in which:—

Figure 1 is an isometric view showing a horticultural frame constructed according to the invention.

Figure 2 is a sectional elevation taken on line A—A of Figure 1.

Figure 3 is a similar view to Figure 2, but shows the top or light of the frame reversed so as to allow rain water falling on the glazing to run between the overlapping portions.

Figure 4 is a detail view showing the hinge socket and hinge.

Figures 5 and 6 are illustrative of details hereinafter referred to.

Referring to the drawings 1, 1 are the walls of a horticultural frame, 2 is the framework of the top or light, 3, 4 are hinged tongues and 5, 6 sockets whereby the said top or light is positioned on the walls 1, and 7, 7 are the overlapping strips of glass with which the top or light is glazed. These strips of glass are transversely arranged and distanced apart in louvre formation and secured in position within the framework 2 of the top light by means of U-shaped clips 8, said clips 8 being secured to the side members of the framework 2 by means of tacks (not shown), or in any other convenient manner. The side walls of the frame project above the front and rear walls to position the top or light laterally and the side members of the latter are provided with ledges 9 for supporting the ends of the glass strips 7, whilst the front and rear edges of said top or light are positioned by means of the hinged tongues 3, 4 on the walls 1, 1 of the frame taking into sockets 5, 6 on the said front and rear edges respectively of the top or light. It will be seen that, by the use of such hinged tongues 3, 4, the top or light can be turned back about either its front or rear edge as indicated by the arrows in Figures 2 and 3, or if desired can be lifted bodily off the frame 1. In this connection the top or light may have crosspieces 10 adapted to afford handles for lifting and the engaging edges of the hinged tongues 3, 4 may be bevelled and tapered (see Figure 4), so as to pass more easily into the sockets 5, 6. In addition to the clips 8 the glass strips 7 are preferably further supported at their ends by putty or the like 11; or rubber or like resilient wedges 12, see Figure 5, may be substituted for the clips 8 and putty 11. Also, if desired, rubber strips 13, see Figure 6, of wedge shape in section may be provided for sealing the gaps between the glass strips 7 in very cold weather, and in this connection said strips will be especially applicable in the case of greenhouse glazing.

It will be seen that the present invention provides for the admission of air to the interior of a garden frame by way of passages afforded between the overlapping portions of the pieces or strips of glass in such a manner as will ensure the circulation of the air to prevent condensation on the inner surfaces of the glass. Moreover, by reversing the frame, rain water may be admitted to the interior in addition to air by way of the passages between the overlapping portions of the pieces of glass, whilst if it is desired to admit still more air the top or light can be raised about one or other of its hinged connections with the wall structure and propped in the open position.

The louvre arrangement of glazing according to the present invention may be applied to the roof and side or wall structures of greenhouses.

I claim:

1. A greenhouse construction comprising a rectangular frame including pairs of parallel side and end bars, and means on said side bars for supporting a plurality of panes of glass in a predetermined fixed relation to said frame and in overlapped relation to each other, said panes having their overlapping edges spaced apart by said supporting means to afford ventilating openings.

2. A greenhouse construction comprising a rectangular frame including pairs of parallel side and ends bars, said side bars having substantially vertical faces, and means on said faces for supporting a plurality of panes of glass in a predetermined fixed relation to said frame and in overlapped relation to each other, said panes having their overlapping edges spaced apart by said supporting means to afford ventilating openings.

3. A construction in accordance with claim 1 characterized by the fact that said rectangular frame is adapted to be bodily removed and replaced in a reversed position so that water falling on the panes of glass will run between the overlapping portions and drip off the lower edges of the panes of glass on the soil enclosed by the frame.

4. A greenhouse construction comprising substantially vertical front and rear walls and a rectangular top light frame including pairs of parallel side bars and a pair of parallel front and rear end bars, said end bars each having a removable hinge connection with said front and rear wall respectively, whereby said top light frame may be swung forwardly or rearwardly on one or the other of said walls, said side bars having means for supporting a plurality of panes of glass in a predetermined fixed relation to said frame and in overlapped relation to each other, said panes having their overlapping edges spaced apart by said supporting means to afford ventilating openings.

5. A greenhouse construction comprising substantially vertical front and rear walls and a rectangular top light frame removably mounted on the wall structure by means of slotted brackets on said frame engaged by tongues projecting upwardly from said front and rear walls, respectively.

6. A construction in accordance with claim 4, characterized by the fact that said removable hinges comprise tongues hinged to said front and rear walls and sockets fixed to said front and rear bars of said frame respectively, said sockets being adapted to receive said tongues to removably secure said frame in position on said wall.

7. A construction in accordance with claim 4 characterized by the fact that said removable hinges comprise tongues hinged to said front and rear walls and sockets fixed to said front and rear bars of said frame respectively, said tongues having their upper edges tapered to facilitate entrance into said sockets, said sockets being adapted to receive said tongues to removably secure said frame in position on said walls.

8. A construction in accordance with claim 2 characterized by the fact that said panes of glass are secured in predetermined relation to said vertical faces of said side bars by U-shaped metallic clips fixedly secured to said faces and embracing the edges of said panes of glass.

9. A construction in accordance with claim 2 characterized by the fact that the lower edges of the panes of glass are secured to the vertical faces of said side bars by U-shaped clips fixedly secured in predetermined position on said faces and embracing said edges of said panes, and the upper edges of said panes are supported by a laterally projecting strip secured to said vertical faces along a line below said clips.

FRED MARSHALL.